June 9, 1936.  C. T. WALTER  2,043,683
TUBE EXPANSION EXTRUSION DIE
Filed Dec. 21, 1933
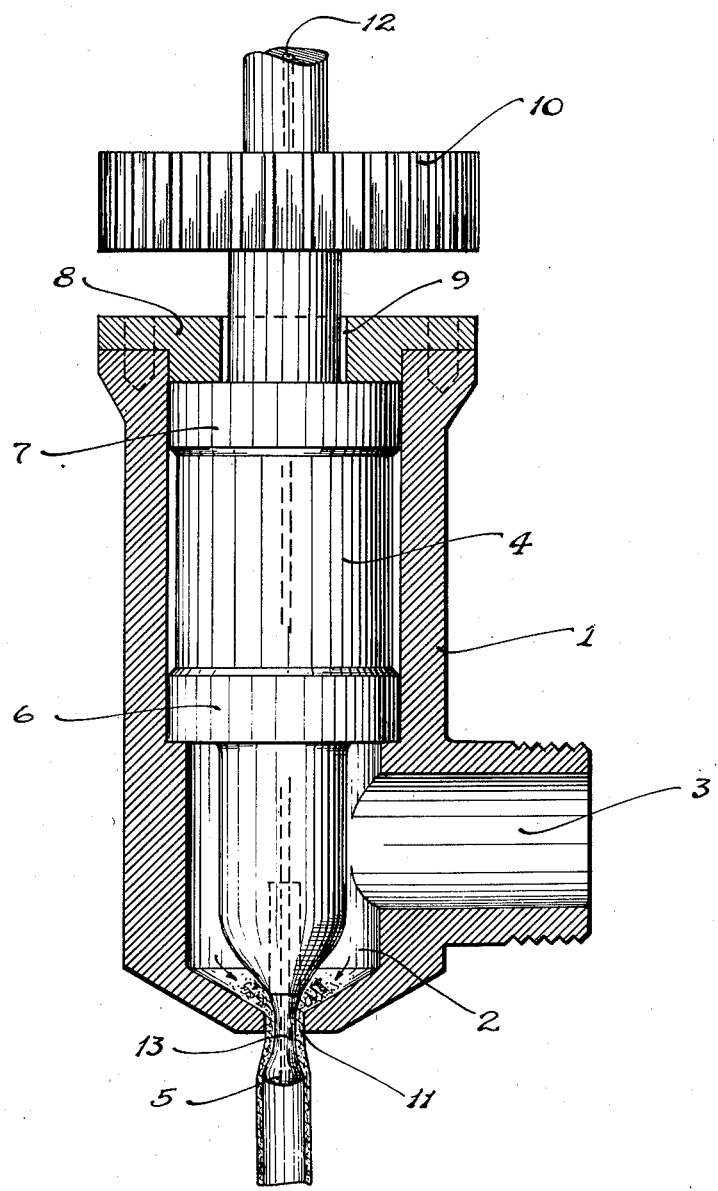
Charles T. Walter
INVENTOR.
WITNESS -
BY
ATTORNEY.

Patented June 9, 1936

2,043,683

UNITED STATES PATENT OFFICE 2,043,683

TUBE EXPANSION EXTRUSION DIE

Charles T. Walter, Chicago, Ill., assignor to Industrial Patents Corporation, Chicago, Ill., a corporation of Delaware Application December 21, 1933, Serial No. 703,352

5 Claims. (Cl. 28—8)

This invention relates to an extrusion die.

One of the objects of this invention is to provide an extrusion nozzle adapted for extruding plastic, semi-liquid material in the form of a tube.

Another object of the present invention is to provide an extrusion nozzle adapted to form tubular soap.

Other objects of the invention will be apparent from the description and claims which follow.

It will be understood, of course, that the extrusion die or nozzle of the present invention may be utilized for any desired purpose and the device will be discussed in this specification as used in the formation of tube soap such as is more particularly described and claimed in my copending application entitled Soap product and method of making the same, Serial No. 703,350, filed December 21, 1933, by way of illustration and not by way of limitation.

The extrusion die of the present invention is of the general type and may be used for the same general purposes as the extrusion device described and claimed in my copending application, entitled Extrusion device, Serial No. 703,351, filed December 21, 1933.

The present application is specifically concerned with the bulbous expansion means at the orifice end of the rotating spindle, as will be more particularly described hereinafter.

Referring now to the drawing which discloses in cross-section an extrusion die provided with the expanding means with which this application is concerned:

Within casing 1 is a chamber 2 into which soap in a plastic, semi-liquid condition may be forced under hydraulic pressure through pipe 3. Spindle 4 is rotatably mounted within casing 1 and terminates in an expansion bulb 5. Shoulders 6 and 7 on spindle 4 provide bearings for the rotation of the spindle. It will be noted that the spindle passes through collar 8 at 9 and may be driven by gear 10. Soap coming into chamber 2 passes out orifice 11 and is expanded into a tube larger in diameter than orifice 11 by bulb 5. Air is admitted through breather opening 12. Bulb 5 is a separate piece pressed into place in spindle 4 after spindle 4 has been placed within casing 1.

In operation, plastic soap is forced under hydraulic pressure through pipe 3 and thence into chamber 2. From chamber 2 the soap passes through orifice 11, around pin 13 and is formed into a tube which is expanded by bulb 5. Air admitted through breather tube 12 prevents the collapse of the tube after formation.

I claim:

1. An extrusion die for continuously extruding in tubular form semi-liquid material under hydraulic pressure comprising a housing having a chamber for the reception of plastic semi-liquid material under hydraulic pressure and provided with an extrusion orifice and a spindle rotatable in said orifice whereby a continuous tube of material may be extruded from the orifice, said spindle terminating in an expansion bulb adapted to permanently expand the said tube to a diameter greater than the diameter of the extrusion orifice.

2. An extrusion die for continuously extruding in tubular form semi-liquid material under hydraulic pressure comprising a housing having a chamber for the reception of plastic semi-liquid material under pressure, an extrusion orifice in said housing and a spindle mounted in said housing and rotatable therein, said spindle provided with a pin adapted to rotate in said orifice whereby a continuous tube of material is extruded from the orifice, and an expansion bulb at the end of said pin without said orifice adapted to expand the said tube and permanently increase the same diametrically to a diameter greater than that of the extrusion orifice.

3. An extrusion die for continuously extruding in tubular form semi-liquid material under hydraulic pressure comprising a housing having a chamber for the reception of plastic semi-liquid material under hydraulic pressure, an extrusion orifice in said housing and a spindle mounted in said housing and rotatable therein, said spindle provided with a pin adapted to rotate in said orifice whereby a continuous tube of material is extruded from the orifice, and an expansion bulb at the end of said pin without said orifice adapted to permanently expand the said tube diametrically to a diameter greater than that of the extrusion orifice, said spindle having an opening throughout its length whereby air may be passed entirely through said spindle, pin and expansion bulb.

4. An extrusion die for continuously extruding in tubular form semi-liquid material under hydraulic pressure comprising a housing, an extrusion orifice in said housing, a spindle mounted in said housing and rotatable therein, a chamber in said housing for the reception of plastic semi-liquid material under hydraulic pressure, an inlet opening leading to said chamber and a passage connecting said orifice and said chamber, said spindle provided with a pin integral therewith and adapted to rotate in said orifice whereby a continuous tube of material is extruded from the orifice, and an expansion bulb at the end of said pin without said housing adapted to permanently expand the said tube diametrically to a diameter greater than that of the extrusion orifice, said spindle and pin having an opening throughout their length.

5. An extrusion die for continuously extruding in tubular form semi-liquid material under hydraulic pressure comprising a housing having a chamber for the reception of plastic semi-liquid material under hydraulic pressure, an orifice in said housing, a spindle rotatable in said housing provided with a pin rotatable in said orifice whereby a continuous tube of the material is extruded from the orifice, and means for permanently expanding tubes formed by said pin and said orifice to produce a continuous tube of greater diameter than that of the orifice.

CHARLES T. WALTER.